Aug. 31, 1965   R. J. COHEN ETAL   3,204,135
GYRO SPIN MOTOR ROTATION DETECTOR
Filed Jan. 10, 1962   4 Sheets-Sheet 1
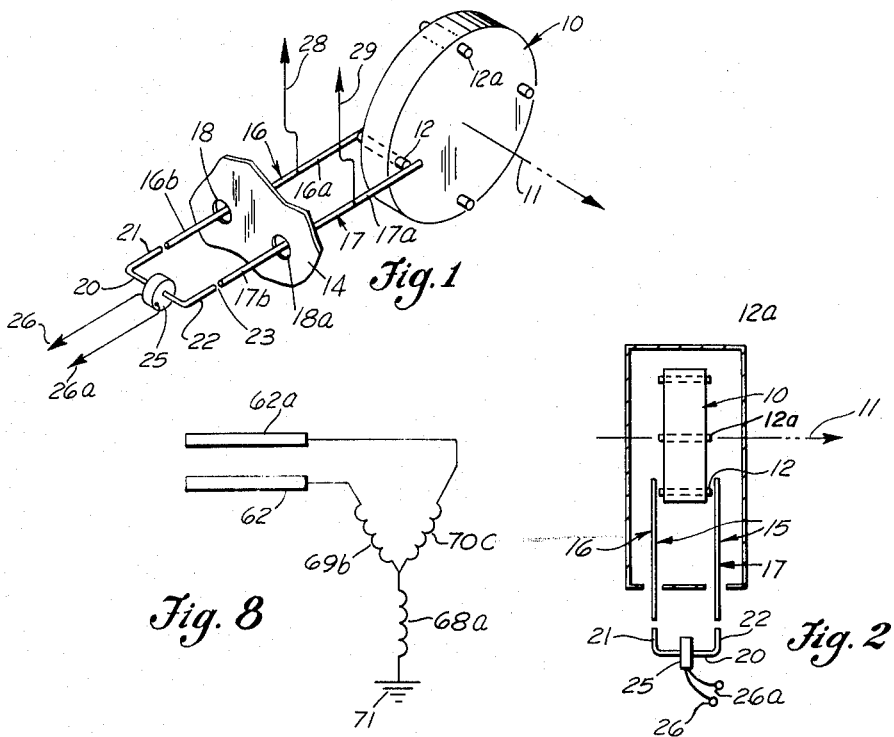
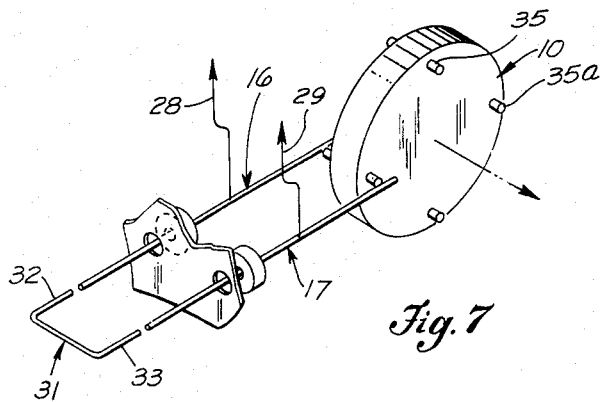
WALTER M. CAROW
ROBERT J. COHEN
ROLF K. BRODERSEN
INVENTORS
BY Sal A. Giarratana
ATTORNEYS Aug. 31, 1965 R. J. COHEN ETAL 3,204,135
GYRO SPIN MOTOR ROTATION DETECTOR
Filed Jan. 10, 1962 4 Sheets-Sheet 2
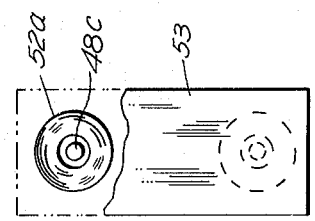
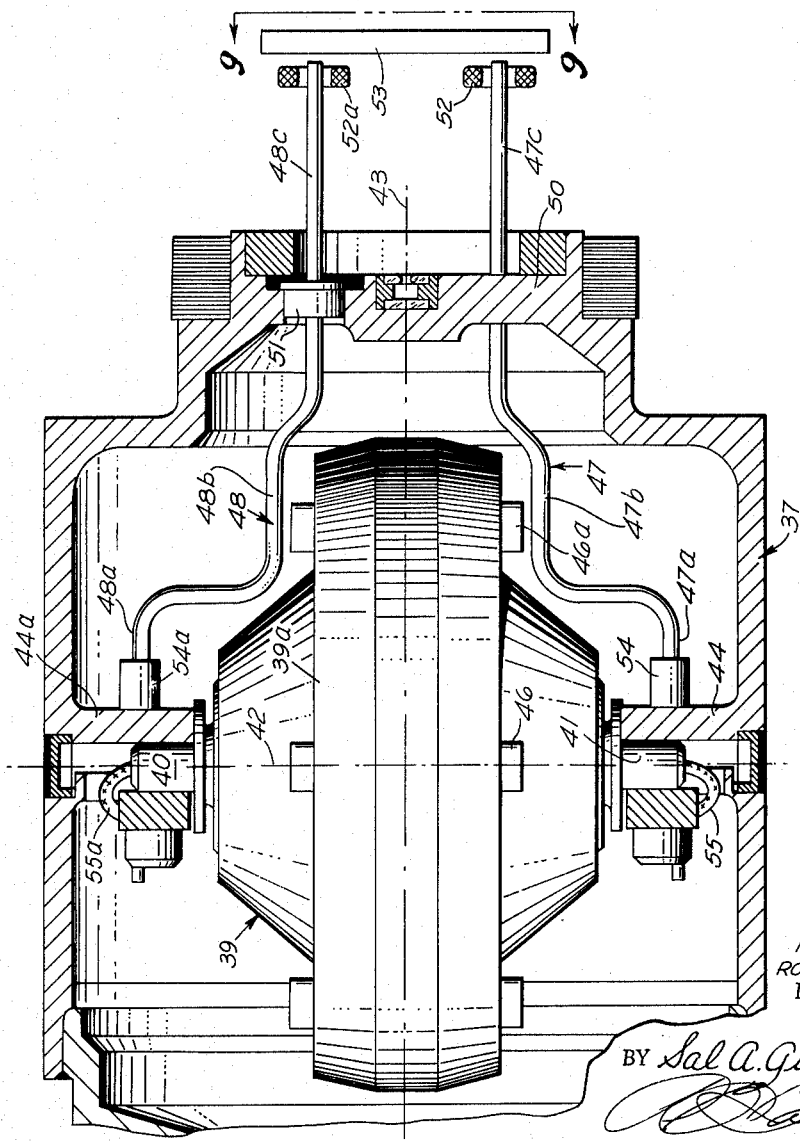
WALTER M. CAROW
ROBERT J. COHEN
ROLF K. BRODERSEN
INVENTORS
BY Sal A. Giarratana
ATTORNEYS

WALTER M. CAROW
ROBERT J. COHEN
ROLF K. BRODERSEN
INVENTORS

Aug. 31, 1965　　　R. J. COHEN ETAL　　　3,204,135
GYRO SPIN MOTOR ROTATION DETECTOR
Filed Jan. 10, 1962　　　　　　　　　　　　4 Sheets-Sheet 4

WALTER M. CAROW
ROBERT J. COHEN
ROLF K. BRODERSEN
INVENTORS

BY Sal A. Giarratana

ATTORNEYS

United States Patent Office 3,204,135
Patented Aug. 31, 1965

3,204,135
GYRO SPIN MOTOR ROTATION DETECTOR
Robert J. Cohen, Wyckoff, Walter M. Carow, West Orange, and Rolf K. Brodersen, Orange, N.J., assignors to General Precision Inc., Little Falls, N.J., a corporation of Delaware
Filed Jan. 10, 1962, Ser. No. 165,355
9 Claims. (Cl. 310—46)

This invention relates to gyros, such as those used for aircraft, and the like, and is particularly directed to gyros equipped with high speed motor driven rotors.

It is primarily directed to an improved means for determining and detecting the rotational angular velocity of the rotor of the gyro.

The primary purpose of the invention is to provide a device giving an output signal, the pulse frequency of which is proportional to the angular velocity of the gyro spin motor.

In the prior art in gyros in which the rotor is floated in a fluid, separate flex leads were employed to carry the signal from a detector attached to the spin motor, which is located in the gyro float, to the outer housing of the gyro. From the housing of the gyro, the signal is transmitted to the external portion of the gyro by conventional wiring means.

This construction involved complications, in that the space required for the flex leads was excessive and because the mechanical restraint of the flex leads acting about the precession axis of the gyro tended to retard the movement of the gyro. In addition to this, separate header terminals were required for the spin motor monitor.

The primary advantage of applicants' construction over the prior art is the elimination of the need for flex leads and low coercion between the movable float and the stationary housing.

Another advantage is the reduction of the float area previously required for the extra terminals and also the greater reliability due to the elimination of the flex leads.

Another feature of applicants' construction is the reduced fabrication costs due to the elimination of the flex leads.

A primary object of the invention is to provide header terminals for the gyro rotor, the header terminals performing the dual function of carrying the voltage to the motor, and at the same time transmitting from the motor pulse signals indicating the speed of rotation of the rotor.

Another major advantage is the elimination of the separate flex leads normally required for the spin motor monitor.

The accompanying drawings, illustrative of one embodiment of the invention and several modifications thereof, together with the description of their construction and the method of operation, application, and utilization thereof, will serve to clarify further objects and advantages of the invention.

In the drawings:

FIGURE 1 is a schematic modified perspective diagram of the arrangement of the various parts of the gyro, including the relation between the header, the rotor of the gyro, and the coil fitted to the return path which function in co-ordination with the header.

FIGURE 2 is a schematic plan view of a portion of the apparatus shown in FIGURE 1 showing the relation between the rotor, the header, and the coil fitted to the return path used in combination with the header.

FIGURE 3 is a longitudinal section through the rotor of a gyro, such as that shown in FIGURE 4, showing the relation between the header and the permanent magnets attached to the rotor of the gyro.

FIGURE 7 is a schematic modified perspective diagram of a modification of the gyro shown in FIGURE 1, the return path being replaced by a U-shaped permanent magnet, the bars inserted in the rotor wheel being made of a magnetic material.

FIGURE 8 is a schematic diagram of the windings of a three-phase motor, showing the method of connecting the sections of the header to the windings of the motor.

FIGURE 9 is a sectional view taken on line 9—9 of FIGURE 3.

Figure 4:
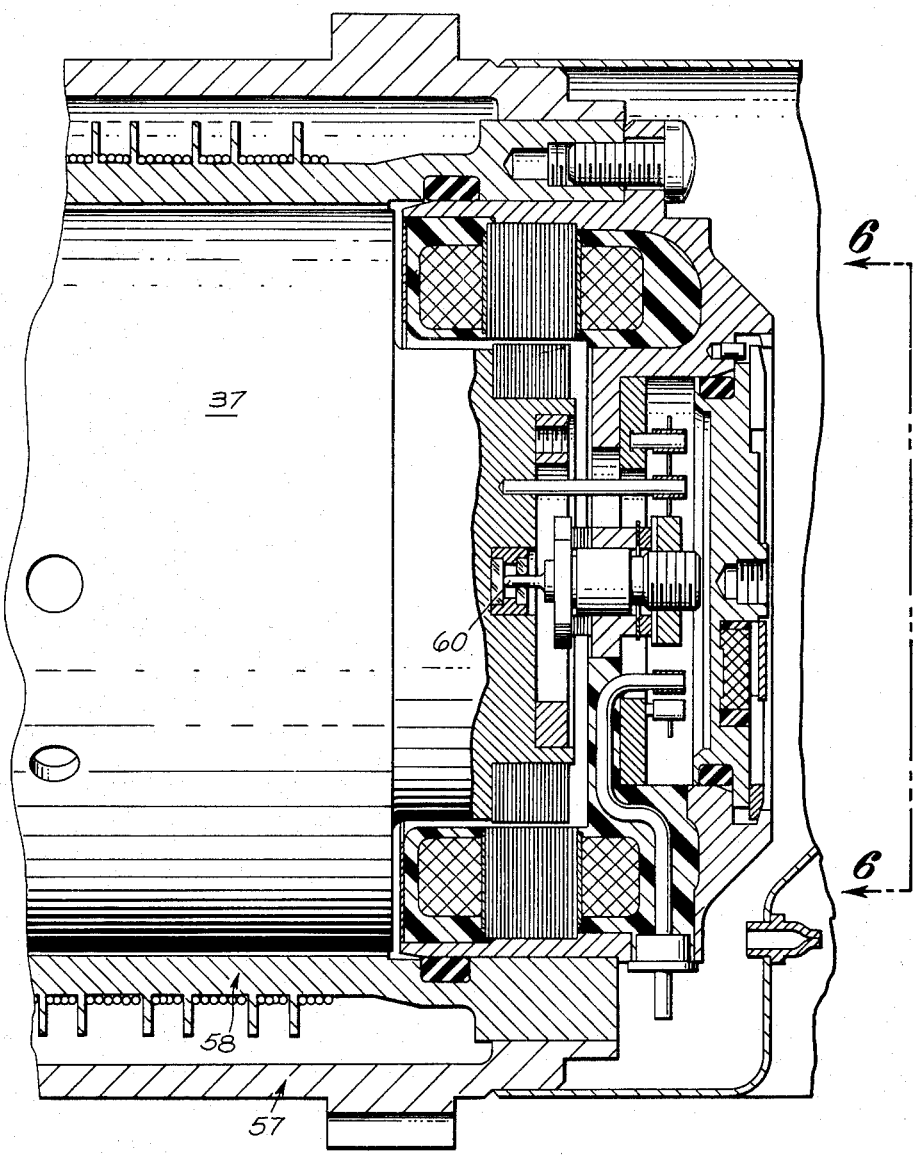
FIGURE 4 is a longitudinal section through the assembled gyro, including the gyro float and rotor combination shown in FIGURE 3 and the housing supporting the float and the rotor.

It will be understood that the following description of the construction and the method of operation and utilization of the "Gyro Spin Motor Rotation Velocity Detector" is intended as explanatory of the invention and not restrictive thereof.

One embodiment of the construction shown schematically in FIGURES 1 and 2 comprises a rotor wheel 10 similar to that shown in FIGURE 1, the rotor wheel being rotatably supported about a spin axis 11. The rotor wheel has a plurality of equally-spaced permanent magnetic inserts 12 inserted therein and attached thereto, the inserts being equally spaced radially, relative to the axis of the rotor, the axes of the inserts being substantially parallel to the axis of rotation 11 of the rotor wheel.

FIGURE 1 also shows the end wall 14 of the rotor float similar to that shown in FIGURE 3.

A header 15 consisting of two substantially parallel legs 16, 17 is inserted through the end wall 14 of the rotor float, a hermetic seal 18, 18a surrounding each leg of the header in a manner similar to that shown in FIGURE 3.

Each leg of the header 15 is formed in two or more sections, an inner section 16a, 17a extending from the end wall 14 to a point adjacent the projecting ends of one of the permanent magnets 12, 12a fitted to the rotor, and a second or outer section 16b, 17b extending beyond the end wall of the rotor, the outer sections being formed of soft iron or other type of magnetic material.

A return path consisting of a central section 20 and a pair of side legs 21, 22, each of which is co-axially aligned with one section 16b, 17b of the header, is located beyond the outer ends of the sections of the header, an air gap 23 being formed between each leg 21, 22 of the return path and the adjacent end of one section 16b, 17b of the header.

A stationary coil 25 is fitted to, and surrounds the central section 20 of the return path, the coil having a pair of output leads 26, 26a connected thereto, the leads being connected to the stator of the motor in a manner hereinafter described.

The two legs 16, 17 of the header are of composite construction, one section which extends from the end wall 14 to the permanent magnets 12, 12a inserted in the rotor wheel being made of a magnetic material, the outer section of each leg extending from the end wall to a point adjacent the ends of the legs 21, 22 of the return path being made of soft iron or other magnetic material for reasons hereinafter described in greater detail.

A pair of motor power flex leads 28, 29 is connected to the inner section of the two legs 16, 17 of the header 15, the flex leads 28, 29 being connected to inner sections 16a, 17a, respectively, such as by soft soldering or by mechanical clamping, or the like, to provide electrical connections, to transmit power thereto.

The speed monitor information received from the two legs 16, 17, of the header is coupled magnetically to the two legs 21, 22 of the return path shown in FIGURE 1, which links the monitor pick-off coil 25 to the legs 16, 17 of the header 15.

The operation of the apparatus is substantially as follows: As the rotor wheel 10 is rotated, the projecting ends of the permanent magnets 12, 12a inserted in the rotor wheel progressively individually approach the end of the magnetic portion 16a, 17a of the adjacent leg of the header.

The flux transmitted from the magnetic portion 16a, 17a of each leg of the header passes through the outer portion 16b, 17b of each leg of the header, from which it is transmitted to the adjacent leg 21, 22 of the return path.

A voltage is generated in the coil 25 surrounding the central section of the return path by the magnetic flux received from the legs of the header in accordance with the generated voltage equation.

$$E = 4.44 f N A B \times 10^{-8}$$

B = the change in magnetic flux (in gauss) linking the magnetic circuit with the permanent magnet from the fully engaged position to the fully disengaged position.

N = the number of coil turns in the monitor coil 25.

A is the effective cross-sectional area of the two legs 16, 17 of the header.

$f$ is the frequency of the magnetic field linking the return path supporting the coil to the two legs 16, 17 of the header.

FIGURE 7 shows a modification of the construction shown in FIGURE 1.

A U-shaped permanent magnet 31 having a pair of legs or poles 32, 33 aligned with the legs 16, 17 of the header 15 is mounted adjacent one end of the header sections 16, 17.

The spin motor rotor shown in FIGURE 7 is substantially the same as that shown in FIGURE 1, except that a plurality of soft iron bars 35, 35a is substituted in place of the permanent magnets shown in FIGURE 1.

These bars complete the magnetic circuit, the magnetic lines of force flowing from the poles 32, 33 of the permanent magnet through the legs 16, 17 of the header. When one of the iron bars 35, 35a inserted through the spin motor approaches the adjacent ends of the legs 16, 17 of the header, the magnetic circuit is completed through the bars 35, 35a which replace the return path shown in FIGURE 1.

In all other respects, the operation of the mechanism shown in FIGURE 7 is substantially the same as that shown in FIGURE 1, the legs 16, 17 of the header receiving magnetic lines of force from the permanent magnet 31, and as the bars 35, 35a inserted through the rotor wheel approach the end of the leg 16, 17 of the header, a signal is transmitted through the header.

The flex leads 28, 29 are connected to the stator of the motor and function in substantially the same manner as that shown in FIGURE 1.

FIGURE 3 shows a modification of the gyro shown in FIGURE 1. The float includes a hollow tubular drum 37 which is rotatably supported within a hollow tubular outer housing shown in FIGURE 4. A motor 39 of circular cross-section is supported within the drum 37 by a pair of stub shafts 40, 41 located at the extreme ends of the motor, the stub shafts supporting the motor, the outer portion, or rotor 39a of which rotates about an axis 42 which is substantially perpendicular to the longitudinal axis 43 of the drum.

The stub shafts 40, 41 are supported by a pair of hollow cylindrical hubs 44, 44a which are integral with the drum 37, the hubs being located on the axis of rotation 42 of the motor.

A plurality of equally-spaced radially positioned permanent magnets 46, 46a is inserted through the outer casing of the motor 39, the magnets being substantially parallel to the axis of rotation 42 of the motor.

A header consisting of a pair of nominally parallel sections 47, 48 is supported within the interior of the drum 37 of the float.

Each section 47, 48 of the header includes a connecting end 47a, 48a, a central portion 47b, 48b, which is substantially parallel to the longitudinal axis 43 of the drum, each central portion 47b, 48b being located adjacent one of the poles of the permanent magnet bars 46, 46a inserted in the outer housing of the motor 39, and an outer section 47c, 48c which is also substantially parallel to the longitudinal axis 43 of the drum, each outer portion passing through an opening through the outer wall 50 of the drum 37, a seal 51 made of glass, or other suitable material supporting each section of the header in the wall of the drum, and sealing the drum around the header section 47c, 48c.

At the outer end of each section 47, 48 of the header, a stationary coil 52, 52a is mounted, each coil 52, 52a surrounding one section 47c, 48c of the header, the coils functioning in substantially the same manner as those shown in FIGURE 1, a return path member 53 made of soft iron or other suitable magnetic material being located adjacent the ends of the two header sections to complete the magnet circuit through the header sections.

A connector 54, 54a is fitted to the connecting end of each of the header sections 47, 48, each connector being fitted to the adjacent hub 44, 44a of the drum of the float. The connectors 54, 54a transmit the power required to drive the motor through flexible leads 55, 55a inserted through the hubs 44, 44a of the float drum 37 to the stator of the motor.

The operation of the construction shown in FIGURE 3 is substantially the same as that shown in FIGURE 1 and hereinbefore described.

As the case of the motor 39 is rotated, the projecting ends of the permanent magnets 46, 46a inserted in the motor casing progressively individually approach the central portion 47b, 48b of one section of the header.

The magnetic flux from the central portion of each section 47, 48 of the header, received from the permanent magnet 46, 46a, passes through the header section to the return path 53 at the end of the header sections.

A voltage is generated in each of the coils 52, 52a surrounding each of the header sections, by the magnetic flux received from one of the permanent magnets 46, 46a in accordance with the equation hereinbefore specified.

The outlet leads from the coils 52, 52a therefore transmit a signal indicating the rotational angular velocity of the permanent magnets 46, 46a attached to the case of the motor, relative to the nominal position thereof, as determined by the fixed coil 52, 52a which surrounds each header section 47, 48. From these signals the speed of rotation of the motor is determined in the manner hereinbefore described.

FIGURE 4 shows the assembled gyro in which the float drum 37, shown in FIGURE 3 is mounted.

The gyro includes a sealed outer housing 57, a tubular inner housing 58, fitted to and supported by the outer housing 57.

The float drum 37 is rotatably mounted within the inner housing. The float drum is rotatably supported by a pair of jewel bearings 60, each of which is supported by an end cap attached to one end of the inner housing 58.

The area surrounding the float drum is filled with a flotation fluid, such as a silicone fluid, or the like.

Figure 6:
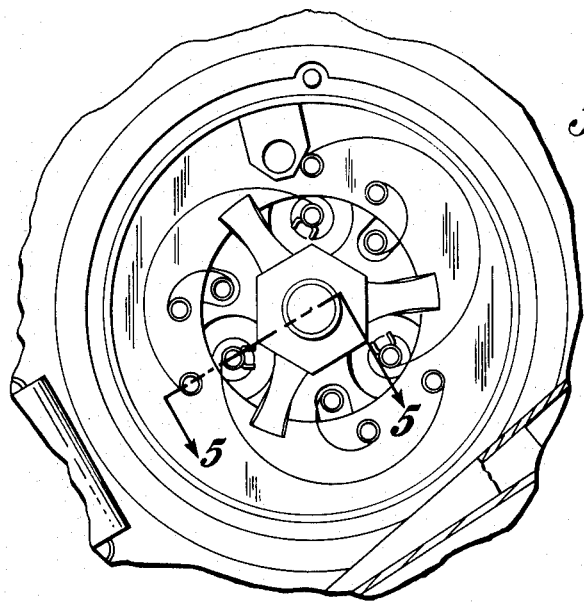
FIGURE 6 is a rear elevational view of a portion of the gyro, shown in FIGURE 4, with the outer cover removed, the view being taken on the line 6—6, FIGURE 4.
Figure 5:
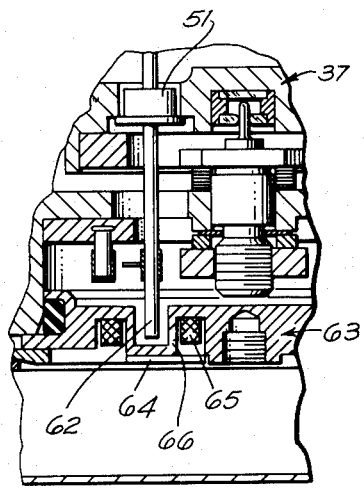
FIGURE 5 is a longitudinal section through a portion of the gyro shown in FIGURE 4, showing the magnetic header, and the pickup coil surrounding a portion of the header, the section being taken on the line 5—5, FIGURE 6.

FIGURE 5 shows a section through a portion of the gyro shown in FIGURES 4 and 6 fitted with a modification of the header sections shown in FIGURE 3.

The float drum 37 which is substantially the same as that shown in FIGURE 3, supports a pair of header sections 62 in a manner similar to that shown in FIGURE 3.

The outer end of each header section 62 passes through and is sealed relative to the end wall of the float by a glass or other type of tubular seal 51, which is inserted in the end wall of the float drum 37 in the same manner as that shown in FIGURE 3.

An end cap 63 is attached to the end of the inner housing 58 in the manner shown in FIGURE 4.

A soft iron return path member 64 is supported by the end cap 63, beyond the extreme end of the header section 62, in a manner similar to that shown schematically in FIGURE 3.

The return path is located adjacent the closed end of the cupped tubular portion 66 of the end cap 63, the interior of which receives the end of the header section 62.

A pick-up coil 65 fixedly attached to the end cap surrounds the outer end of each header section, the pick-up coil surrounding the circumferential outer surface of the cupped tubular portion 66 of the end cap.

The interior of the cupped tubular portion 66 of the end cap, which is surrounded by each pick-up coil, clears the end of the header section by a wide enough margin, to enable the float drum 37 and the header sections attached thereto to be rotatably angularly displaced within the required limits without touching the interior of the pick-up coil, or the inner surface of the tubular portion 66 of the end cap around which the pick-up coils are mounted.

The operation of the header mechanism shown in FIGURE 5 is substantially the same as that shown in FIGURES 1 and 3 and hereinbefore described.

As the float drum 37 is rotatably angularly displaced, the projecting ends of the permanent magnets shown in FIGURE 3 progressively individually approach a portion of each header section 62 in the manner shown in FIGURE 3.

The magnetic flux from the portion of the header sections 62 located near the magnets 46, 46a and received from the permanent magnets 46, 46a, passes through the ends of the header sections shown in FIGURE 5 to the return path member 64, located beyond the end of the header sections 62 and adjacent the end of the tubular portion 66 of the end cap 63 which receives the end of the header section.

A voltage is generated in each of the pick-up coils 65 surrounding the end of each of the header sections 62 by the magnetic flux received from one of the permanent magnets 46, 46a in the same manner as that shown in FIGURES 1 and 3 and hereinbefore described.

Clearance is formed between each cupped tubular portion 66 of the end cap, around which each pick-up coil is placed, and the adjacent end of the header section 62 to allow the drum 37 with the header sections attached thereto to be rotatably angularly displaced within the limitations required.

The outlet leads from the pick-off coils therefore transmit to the motor 39 or other required point, a signal indicating the rotational angular velocity of the permanent magnets 46, 46a attached to the case of the motor, as shown in FIGURE 3.

From these signals, the speed of rotation of the motor is determined in the same manner as that shown in FIGURE 3 and hereinbefore described.

FIGURE 8 shows a schematic diagram of the motor. This is a three phase motor having three windings 68(a), 69(b), 70(c).

Two of the windings 69(b) and 70(c) are respectively connected to the ends of the header sections 62, 62a, thereby transmitting the voltage required to run the motor from the header sections to the windings 69(b), 70(c). Winding 68(a), a third winding, is grounded at 71.

Although but one preferred embodiment of the invention and several modifications thereof have been illustrated and described, it will be apparent to those skilled in the art that many changes may be made in the preferred "Spin Motor Angular Velocity Detector," as illustrated and described, without departing from the spirit and scope of this invention. Accordingly, this invention is to be considered as being limited only by the following claims hereto.

We claim:

1. A rotor velocity detecting mechanism for a gyro having a motor comprising a substantially cylindrical gyro rotor rotatively driven by said motor, a plurality of inserts fitted to and attached to the gyro rotor, said inserts projecting beyond the end faces of the gyro rotor, a multiple section header having a pair of spaced leg sections consisting of magnetic flux conducting material located adjacent the gyro rotor, a portion of each leg section of the header being located adjacent one end of each of the gyro rotor inserts, means operative to transmit magnetic lines of force through said leg sections, means mounted adjacent the ends of the header leg sections, opposite the portion thereof located adjacent the rotor inserts, adapted to complete a magnetic circuit through the header leg sections, a plurality of flexible leads connected to the leg sections of the header operative to transmit voltage through the header leg sections to the motor, and coil means fitted to the detecting mechanism, said coil means adapted to sense a change in magnetic flux in the circuit and to generate and transmit an electrical signal indicating the rotational movement of the gyro rotor to an external point.

2. A rotor velocity detecting mechanism for a gyro, comprising a substantially cylindrical gyro rotor, a motor fitted to the gyro rotor, operative to rotatably drive the gyro rotor, a plurality of inserts fitted to and attached to the gyro rotor, a multiple section signal transmission means located adjacent the gyro rotor, a portion of each section of the signal transmission means being located adjacent one end of each of the gyro rotor inserts, means operative to transmit magnetic lines of force through the signal transmission means, means mounted adjacent the ends of the sections of the signal transmission means opposite the portion thereof, adjoining the gyro rotor inserts adapted to complete the magnetic circuit through the sections of the signal transmission means, coil means connected to the signal transmission means, said coil means having a voltage generated therein, operative to indicate the rotational velocity of the rotor, and a flexible lead connected to each section of the signal transmission means, said flexible leads being adapted to transmit voltage from an external source through the sections of the signal transmission means to the motor driving the rotor of the gyro.

3. A rotor velocity detecting mechanism, as in claim 2, in which the inserts are radially positioned relative to the axis of rotation of the gyro rotor, the axes of the inserts being substantially parallel to the axis of rotation of the gyro rotor.

4. A rotor velocity detecting mechanism, as in claim 2, in which the inserts are permanent magnets, the permanent magnet inserts being radially positioned relative to the axis of rotation of the gyro rotor, the axes of the inserts being substantially parallel to the axis of rotation of the gyro rotor.

5. A rotor velocity indicating mechanism, as in claim 2, in which the rotor inserts are permanent magnets, the means mounted adjacent the end of the sections of the signal transmission means, opposite the portion thereof, adjoining the inserts in the signal transmission means being a return member consisting of magnetic flux conducting material adapted to receive the magnetic lines of force transmitted through the signal transmission means.

6. A rotor velocity indicating mechanism, as in claim 2, in which the rotor inserts are formed of a permanent magnet material, the means mounted adjacent the ends of the signal transmission means, opposite the portion thereof, adjoining the inserts in the gyro rotor being a substantially U-shaped return path having a pair of legs coaxially aligned with the sections of the signal transmission means, the coil means being mounted on and supported by the U-shaped return path.

7. A mechanism for determining the rotational velocity of the rotor of a gyro, comprising a substantially cylindrical gyro rotor, a motor fitted to the gyro rotor operative to rotatably drive the gyro rotor, a plurality of inserts fitted and attached to the gyro rotor, said inserts projecting beyond the end faces of the gyro rotor, a multiple section header located in close proximity to the gyro rotor, a portion of each section of the header being located adjacent one projecting end of each of the gyro rotor inserts, a permanent magnet mounted adjacent the ends of the header sections opposite the portion of the header sections located adjacent the projecting ends of the inserts through the gyro rotor, said permanent magnet being operative to transmit magnetic lines of force through the sections of the header, thence through the inserts fitted to the rotor of the gyro, a flexible lead connected to each section of the header, said flexible leads being adapted to transmit voltage from an external source through the sections of the header to the motor driving the rotor of the gyro, and a stationary coil fitted to each of the header sections, said coils having a voltage generated therein, operative to indicate the rotational velocity of the gyro rotor.

8. A mechanism for determining the rotational velocity of the rotor of a gyro, as in claim 7, in which the inserts are formed of a magnetic material, the inserts being equally spaced and radially positioned relative to the axis of rotation of the gyro rotor, the axes of the inserts being substantially parallel to the axis of rotation of the gyro rotor.

9. A mechanism for determining the rotational velocity of the rotor of a gyro, as in claim 7, in which the permanent magnet mounted adjacent the sections of the header is of U-shaped contour, said permanent magnet having a pair of legs integral therewith, said legs being substantially axially aligned with the corresponding sections of the header.

References Cited by the Examiner
UNITED STATES PATENTS

| | | | |
|---|---|---|---|
| 2,898,552 | 8/59 | McNatt | 74—5.7 X |
| 2,993,159 | 7/61 | Deval | 310—156 X |
| 2,994,023 | 7/61 | Deval | 310—156 |

ORIS L. RADER, *Primary Examiner.*

MILTON O. HIRSHFIELD, *Examiner.*